United States Patent [19]
Rizkovsky

[11] Patent Number: 5,794,381
[45] Date of Patent: Aug. 18, 1998

[54] SELECTIVELY ENGAGEABLE MOTOR DRIVE ASSEMBLY

[75] Inventor: Roy R. Rizkovsky, Lake Elizabeth, Calif.

[73] Assignee: Ricon Corporation, Pacoima, Calif.

[21] Appl. No.: 577,237

[22] Filed: Dec. 22, 1995

[51] Int. Cl.[6] .......................... E05F 15/00; F16H 57/00
[52] U.S. Cl. .................. 49/139; 74/89.22; 74/337.5; 74/405; 74/505; 74/625
[58] Field of Search ............ 49/139, 140; 74/89.22, 74/405, 625, 505, 337.5

[56] References Cited

U.S. PATENT DOCUMENTS

| | | | |
|---|---|---|---|
| 1,646,646 | 10/1927 | Gaylord . | |
| 2,893,256 | 7/1959 | Wargo | 74/337.5 X |
| 4,085,629 | 4/1978 | Forgarollo | 49/140 X |
| 4,147,197 | 4/1979 | Bailey et al. | 160/7 |
| 4,187,734 | 2/1980 | Mann | 74/405 |
| 4,472,910 | 9/1984 | Iha | 49/139 |
| 4,484,649 | 11/1984 | Kennedy et al. | 74/405 X |
| 4,640,050 | 2/1987 | Yamagishi et al. | 49/280 |
| 4,683,770 | 8/1987 | Nettmann | 74/405 X |
| 4,721,146 | 1/1988 | Wardlaw | 74/625 X |
| 5,048,653 | 9/1991 | Fellows | 192/108 X |
| 5,138,795 | 8/1992 | Compeau et al. | 49/138 |
| 5,222,327 | 6/1993 | Fellows et al. | 49/139 |
| 5,263,527 | 11/1993 | Marlatt et al. | 160/7 |

Primary Examiner—Alan D. Herrmann
Attorney, Agent, or Firm—Darby & Darby, P.C.

[57] ABSTRACT

A selectively engageable motor-drive assembly operable for moving a vehicle door or ramp to enable manual operation or motorized operation is provided, having a motor, a pulley drawing a cable attached to the door or ramp, a torque-multiplying arrangement positionable between a fully-engaged position and a partially-disengaged position, and an actuator mechanism for positioning the torque-multiplying arrangement in accordance with a selection of manual or motorized operation. The actuator mechanism may be actuated by a solenoid that is activated by an operator through a control unit. Also, a cam may be provided to define the movement of the actuator mechanism.

21 Claims, 6 Drawing Sheets

SELECTIVELY ENGAGEABLE MOTOR DRIVE ASSEMBLY

FIELD OF THE INVENTION

This invention relates generally to motor drive mechanisms, in particular, selectively engageable motor drive assemblies employing a tensile member, such as a chain or a cable.

BACKGROUND AND SUMMARY OF THE INVENTION

Sliding vehicle doors are well known, in particular, sliding doors for vans or mini-vans. Such vehicle doors are typically manually-operated, that is, opening or closing is accomplished by an operator physically sliding the door in either of two directions along a track in the vehicle body. More recently, however, such sliding doors have been motorized, such as by the provision of a motor which upon activation draws the door open or closed through the use of a cable, wire, or chain. Such power sliding doors are especially accommodating of passengers with limited mobility by opening or closing of the door upon command. Typically, with the activation of a control unit, the power sliding door can open or close without requiring additional effort from the operator.

As convenient as power sliding doors are, it may still be desirable to have such power sliding doors revert to manual operation when desired. For example, if any of the motorized components malfunctions, opening or closing the door would become rather cumbersome, if not impossible. An immobile door is typically not only an inconvenience, but can also pose a serious safety hazard if it traps a passenger inside the vehicle.

While some power-sliding door assemblies allow the motorized components to be freed or decoupled from each other, such decoupling is typically only intermittent or temporary. It would thus be desirable that power door assemblies provide two distinct modes of operation, manual and motorized, each of which may remain in operation for unlimited duration. In addition to addressing the safety concern and inconvenience discussed above, such distinct modes provided by a single vehicle door assembly would also accommodate its operators who desire manual operation and those who desire power-driven operation at any given time.

Moreover, various personal and transit vehicles are now equipped with movable ramps for enabling passengers to egress and ingress the vehicles. Such ramps may also be manually-operated, or motor-driven via a cable or the like. However, it has also become desirable to have such ramps be operable either manually or motorized.

Accordingly, there exists a demand for a selectively engageable motor-drive assembly for vehicle sliding doors and/or vehicle ramps. It is desired that such a motor-drive assembly provide two modes of operation whereby the assembly remains in one mode until the election by the operator of the other mode. Moreover, it is desired that the assembly be able to readily switch between and be operable in either of the two modes without requiring significant effort of the operator. It is also desired that such a motor-drive assembly facilitate both decoupling and recoupling of various motorized components and that the assembly effectively maintain the coupling between driving and driven components for the duration of the motor-drive mode. It is further desired that the motor-drive assembly be simple and compact, yet provide enough power to move vehicle doors or ramps, either of which possibly placing significant load on the assembly.

In accordance with the present invention, a selectively engageable motor-drive assembly operable for moving a vehicle door or ramp to enable manual operation or motorized operation is provided, having a motor, a pulley drawing a cable attached to the door or ramp, a torque-multiplying arrangement positionable between a fully-engaged position and a partially-disengaged position, and an actuator mechanism for positioning the torque-multiplying arrangement in accordance with a selection of manual or motorized operation. The actuator mechanism may be actuated by a solenoid that is activated by an operator through a control unit. Also, a cam may be provided to define the movement of the actuator mechanism. These, as well as other features of the invention, will become apparent from the detailed description which follows, considered together with the appended drawings.

DESCRIPTIONS OF THE DRAWINGS

In the drawings, which constitute a part of this specification, exemplary embodiments demonstrating various features of the invention are set forth as follows.

DESCRIPTION OF THE ILLUSTRATIVE EMBODIMENTS

As indicated above, detailed illustrative embodiments are disclosed herein. However, structures for accomplishing the objectives of the present invention may be detailed quite differently from the disclosed embodiments. Consequently, specific structural and functional details disclosed herein are merely representative; yet, in that regard, they are deemed to afford the best embodiments for purposes of disclosure and to provide a basis for the claims herein which define the scope of the present invention.

Figure 1:
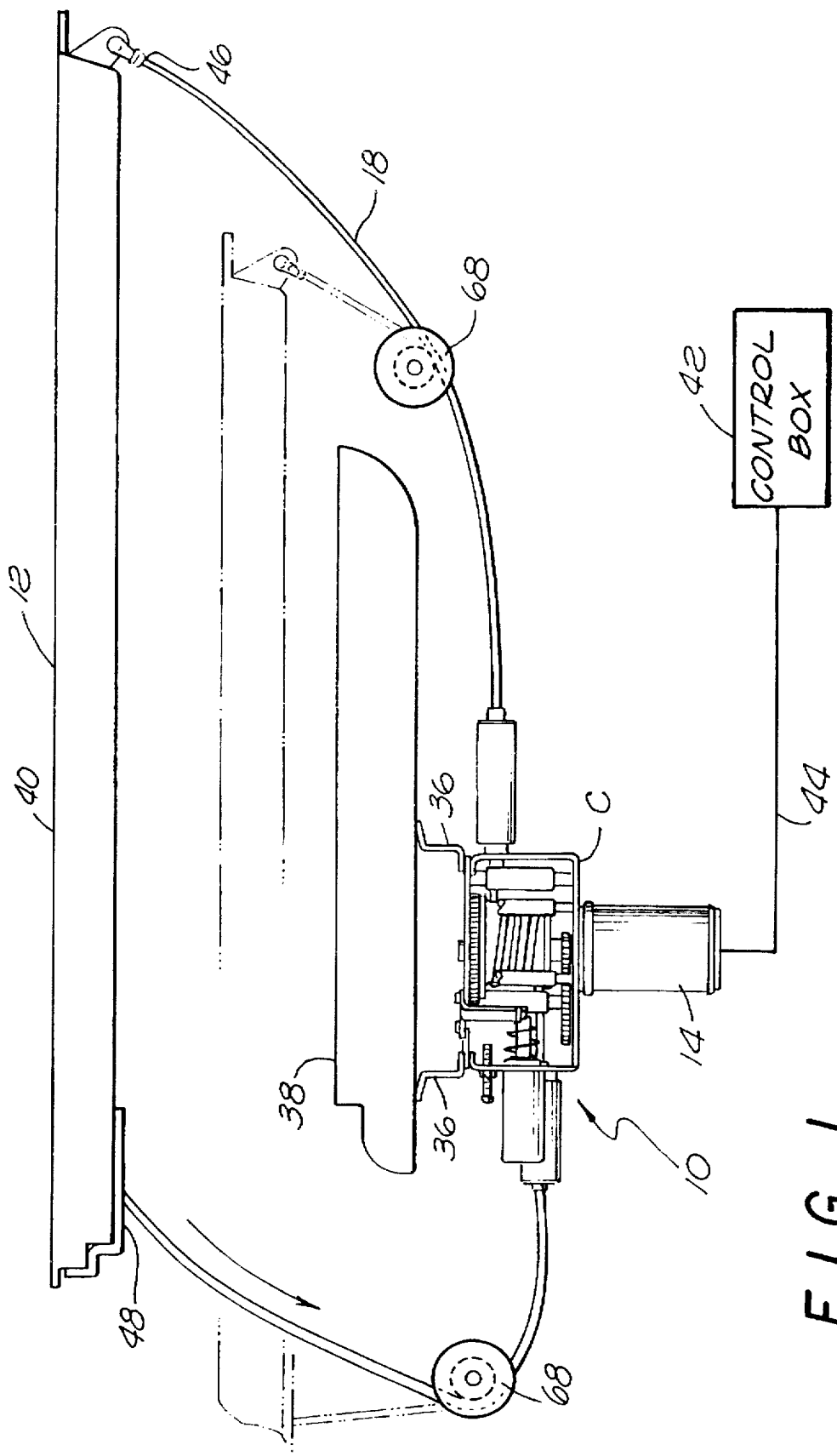
FIG. 1 is a plan view illustrating an embodiment of a selectively-engageable motor-drive assembly for use with a sliding door vehicle.
Figure 2:
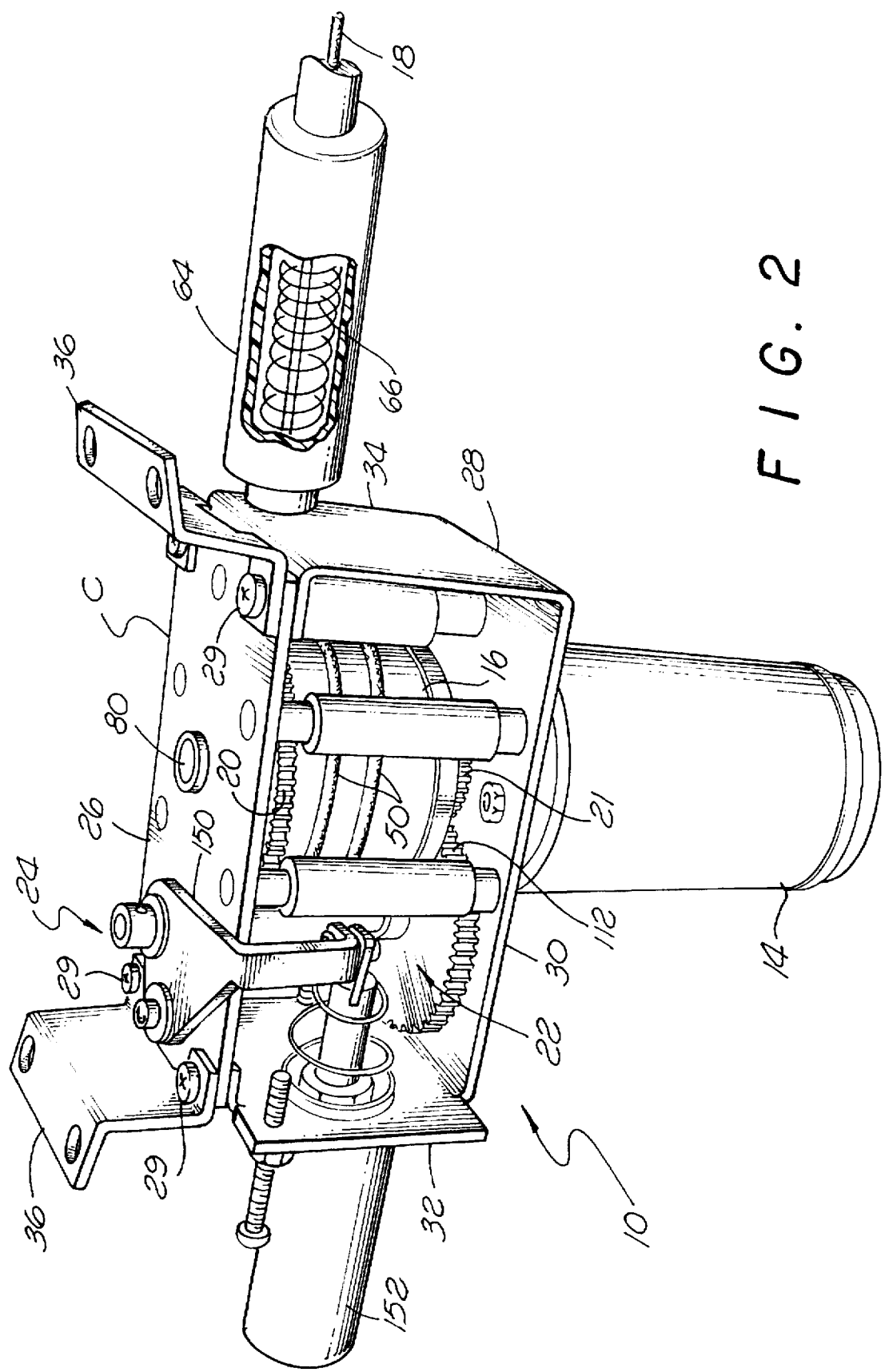
FIG. 2 is a perspective view of the assembly of FIG. 1.

Referring to FIG. 1, a selectively engageable motor drive assembly 10 is provided for moving a structure 12 of a vehicle, e.g., a sliding vehicle door or ramp. Referring also to FIG. 2, the assembly 10 includes primarily a bi-directional motor 14, a pulley 16 drawing a cable 18 attached to the door or ramp, a pulley-gear 20 affixed to the pulley 16, a driving gear 21, a torque-multiplying arrangement 22, and an actuator mechanism 24 for positioning the torque-multiplying arrangement 22 in accordance with the selection of manual or motorized operation. Although the motor 14 may vary depending on the application of the assembly 10, a motor appropriate for use with the assembly 10 may be a Sullivan High-Tork Model Engine Starter, operating on 12 volts DC/80 amps max.

Figure 3:
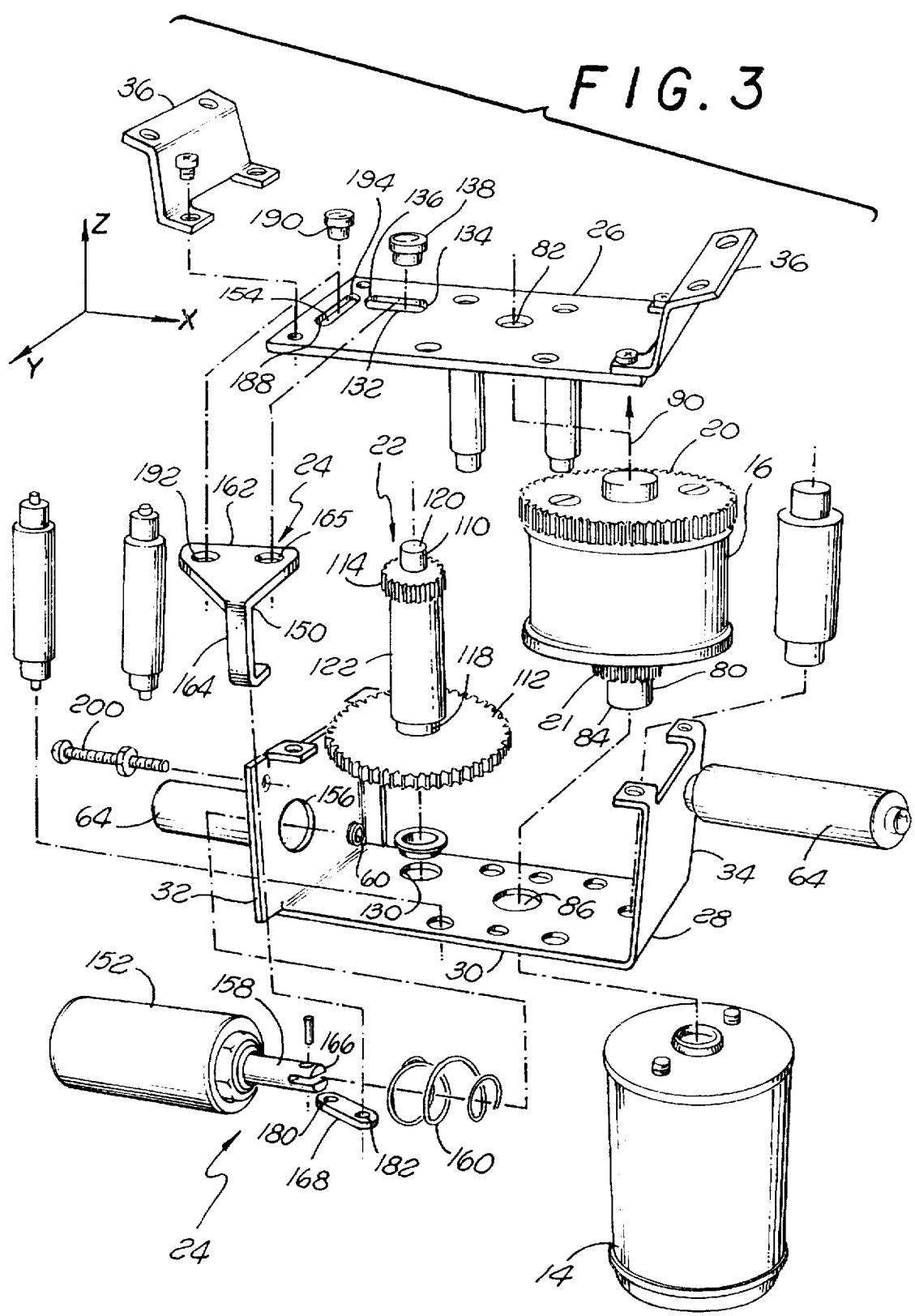
FIG. 3 is an exploded view of the assembly of FIG. 2.

As better shown in FIGS. 2 and 3, the assembly 10 may be substantially housed within a case C comprising a base plate 26 and a three-sided bracket 28 fixedly secured to the base plate 26 by screws 29, the three-sided bracket 28 having a main panel 30 and two side panels 32 and 34. The base plate 26 in turn is fixedly secured by a pair of mounting brackets 36 to an adjacent structure, such as a vehicle body 38, for mounting the assembly 10 to the vehicle. For purposes of facilitating the discussion below, the structure moved by the assembly 10 is taken to be a sliding vehicle door 40. As known in the art, the door 40 is configured to slide along a track (not shown) provided in the vehicle body 38 and may be opened or closed with movement along the track to allow passengers to ingress or egress the vehicle.

In accordance with the present invention, the assembly 10 enables manual operation or motorized (power-driven) operation as elected by an operator. For manual operation, the door 40 may be moved along the track by the operator; when motorized, the door 40 may be moved along the track by the by motor 14 to open or close the door 40. A control box 42 is electrically connected to the motor 14, as represented by line 44, and using the control box 42, the operator may select motorized operation or revert to manual operation at any time.

Facilitating operation in the motorized mode, the tensile member 18 is attached to the door 40. The tensile member 18 may be a cable, a wire, or the like, and while its ends 46 and 48 are attached to the door 40, a segment 50 therebetween is wound on the pulley 16 housed in the case C. In accordance with the present invention, the pulley 16 may be freely rotatable as necessary during manual operation, or be selectively coupled to the motor 14 for motorized operation.

As for the tensile member 18, it is passed through two apertures 60 and 62 configured in the side panels 32 and 34 and wound on the pulley 16 positioned therebetween. Where the motor-drive mode is selected, the pulley 16 is only effective in moving the door 40 if the tensile member 18 is tightly wound on the pulley 16. Accordingly, a tension-maintaining device 64, e.g. a compression spring 66, may be provided at one or both of the apertures 60 and 62 to maintain tension on the tensile member 18. Followers 68 may also be provided on the vehicle body 38 substantially adjacent the assembly 10 to guide the tensile member 18. It is noted that the presence of the assembly 10 causes little if any adverse effect in the manual operation of the door 40, except perhaps the tensile member 18 creating a slight frictional drag when the door 40 is moved.

Referring to FIGS. 2 and 3, other components of the assembly 10 within the case are shown. In particular, the motor 14 positioned outside the case C drives a motor shaft 80 which extends from the motor 14 into the case C through an aperture 82 in the base plate 26. A distal end portion 84 of the motor (or driving) shaft 80 is journaled for rotation into an aperture 86 in the opposing main panel 30. In between the base plate 26 and the main panel 30, the shaft 80 is inserted through the driving gear 21, the pulley 16 and the pulley-gear 20, all of which are housed within the case C. The motor shaft 80 while able to rotate about its axis when driven by the motor 14 experiences no lateral or tilting movement as the apertures 82 and 86 in the base plate 26 and the main panel 30 are configured to limit motion of the motor shaft 80 to stationary rotation only. Accordingly, a longitudinal axis 90 defined by the motor shaft 80 remains substantially perpendicular to the base plate 26 and the main panel 30 and fixed in position relative to the case C.

Figure 8:
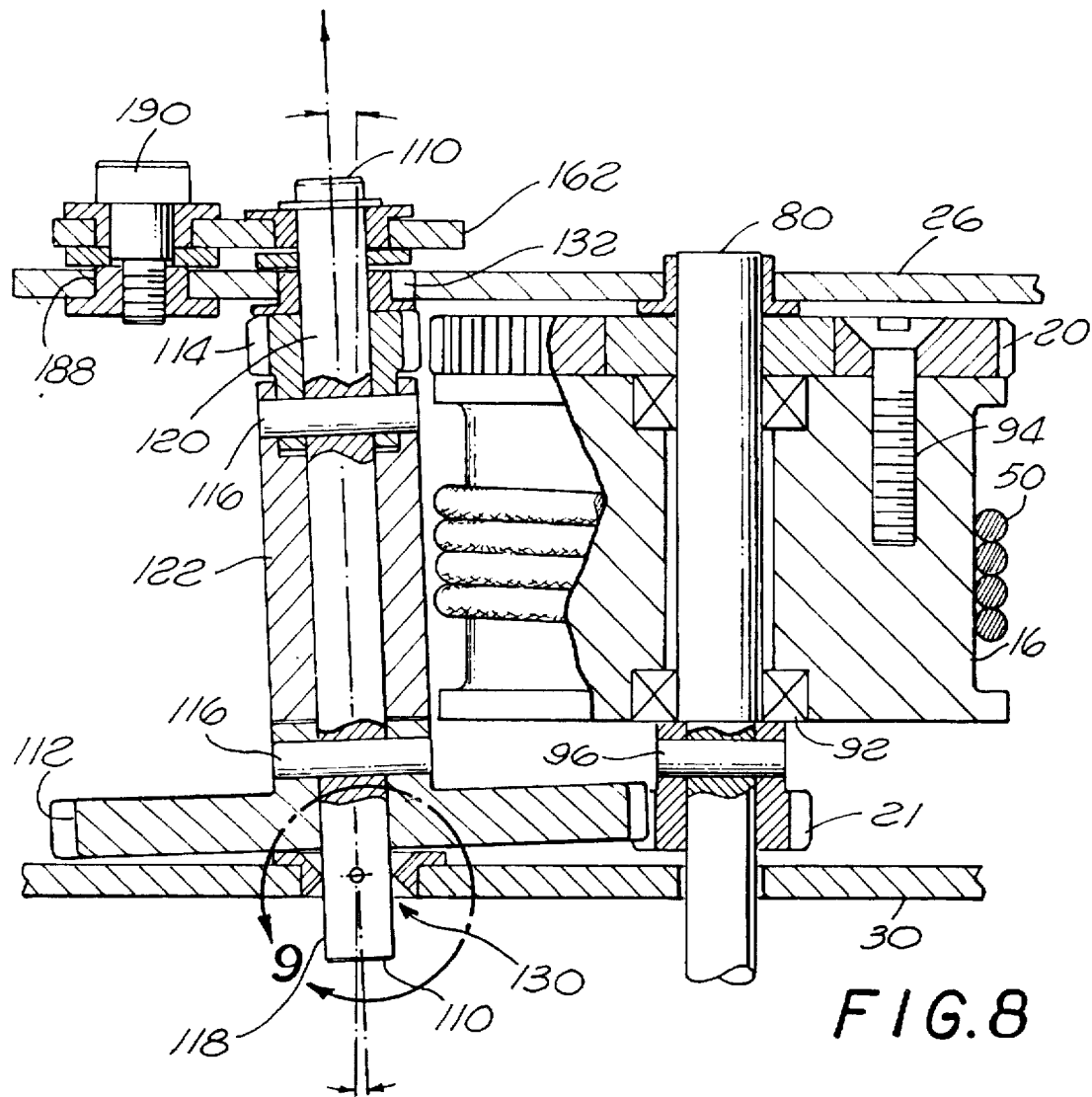
FIG. 8 is a partial cross sectional view of assembly of FIG. 4.

Referring also to FIG. 8, the pulley 16 about which the segment 50 of the tensile member 18 is wound, is configured and enabled by bearings and/or bushings 92 for independent rotation about the motor shaft 80, that is, the pulley 16 may rotate freely on the motor shaft 80. It is this independent rotation that allows the door 40 to be movable for manual operation.

Positioned next to the pulley 16 on the motor shaft 80, the pulley-gear 20 is secured to the pulley 16 for joint rotation therewith. The pulley-gear 20 is positioned between the pulley 16 and the base plate 26. Fasteners 94 such as screws, pins or the like, may be used to secure the pulley-gear 20 to the pulley 16. Accordingly, the pulley 16 and the pulley-gear 20 have joint rotation about the motor shaft 80. In one embodiment, the pulley-gear 20 has a radius comparable, if not equal, to the radius of the pulley 16.

Positioned between the pulley 16 and the main panel 30, the driving gear 21 is secured to the motor shaft 80 by a pin 96 or the like for joint rotation with the motor shaft 80. Thus, unlike the pulley 16 or the pulley-gear 20, the driving gear 21 rotates with and is therefore directly driven by the motor shaft 80. In one embodiment, the driving gear 21 has a radius substantially less than the radii of the pulley 16 and the pulley-gear 20. As explained in detail further below, the relative disparity between the radii of the driving gear 21 and the pulley-gear 20 is part of a distinct scheme embodied within the assembly to increase or "multiply" the effective torque of the motor 14 and to decrease the driven rotational speed of the pulley 16 when coupled to the motor 14.

While the assembly 10 enables manual operation as described above, the assembly 10 provides the actuator mechanism 24 and the torque-multiplying arrangement 22 for the motorized operation. In particular, the actuator mechanism 24 actuates the torque-multiplying arrangement 24 for coupling the otherwise freely rotating pulley 16 to the motor 14 when motorized operation is elected by the operator. The actuator mechanism 24 and the torque-multiplying ("t-m") arrangement 22 are described below.

Referring to FIGS. 2 and 3, the t-m arrangement 22 applies principles well known in the art for simultaneously increasing the effective torque of the motor 14 and decreasing the rotational speed of the coupled pulley 16. Moreover, as mentioned, the t-m arrangement 22 is actuated to couple the pulley 16 to the motor 14 for the motorized operation of the assembly 10. In that regard, only when the t-m arrangement 22 has been moved to its fully-engaged position from its partially-disengaged position is the assembly 10 enabled for motorized operation.

With respect to the t-m arrangement 22, it is housed in the case C. As such, it is desirable for the arrangement 22 to be compact, yet also provide enough torque-multiplication and speed reduction to enable the motor 14 to operate with a significant load, such as the door 40. Best shown in FIG. 3, the t-m arrangement 22 includes a driven shaft 110, a larger gear 112 and a smaller gear 114. The larger gear 112 may have a radius comparable to that of the pulley 16 and the smaller gear 114 may have a radius comparable to that of the driving gear 21. The driven shaft 110 is positioned for longitudinal alignment with the motor shaft 80 of the motor 14. The larger and smaller gears 112 and 114 are mounted on and secured to the driven shaft 110 by pins 116, for rotation therewith. Accordingly, the larger gear 112 and the smaller gear 114 are enabled to rotate and, more importantly to, move with the driven shaft 110. Moreover, the larger gear 112 is positioned near one end portion 118 of the driven shaft 110 for lateral alignment with the driving gear 21 on the motor shaft 80, and the smaller gear 114 is positioned near the other end portion 120 of the motor shaft 80 for lateral alignment with the pulley-gear 20. A tubular spacer 122 may be provided on the shaft 110 to sit between the larger gear 112 and the smaller gear 114.

The driven shaft 110 is similar to the motor shaft 80 in that they both extend between the base plate 26 and the main panel 30 of the case C. However, unlike the motor shaft 80, the driven shaft 110 is enabled to move, e.g., tilt or pivot about the end portion 118 such that a longitudinal axis 124 (FIGS. 5 and 8) defined by the driven shaft 110 is not fixed but rather movable relative to the case C.

Figure 9:
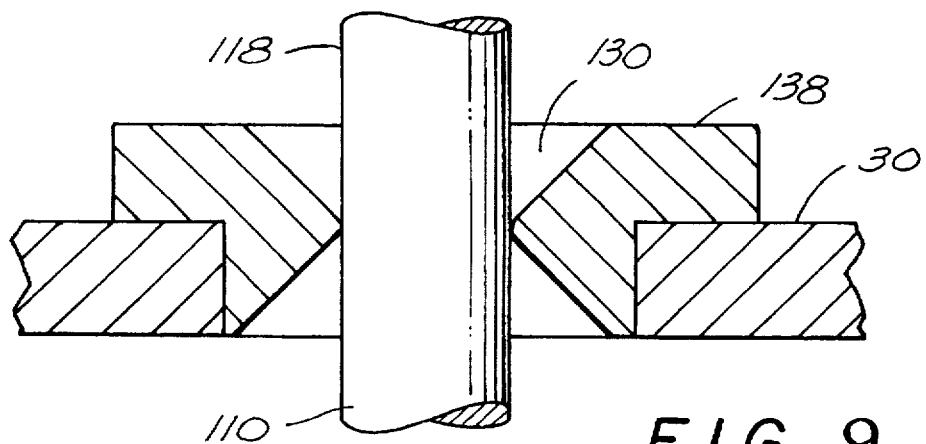
FIG. 9 is an enlarged partial view of a component of the assembly.

As provided in one embodiment, the end portion 118 of the driven shaft 110 is journaled into an aperture 130 provided in the main panel 30 while the other end portion 120 extends through and beyond an elongated slot 132 provided in the base plate 26. The slot 132 has two ends 134 and 136 defining a length extending along the X-axis, enabling the end 120 of the driven shaft 110 to have the movement along the X-axis. At the end portion 118 of the driven shaft 110, a bushing or bearing allowing pivotal motion may be provided. For example, a bushing 138 having a conical cross-section, as shown enlarged in FIG. 9, may be provided.

Figure 4:
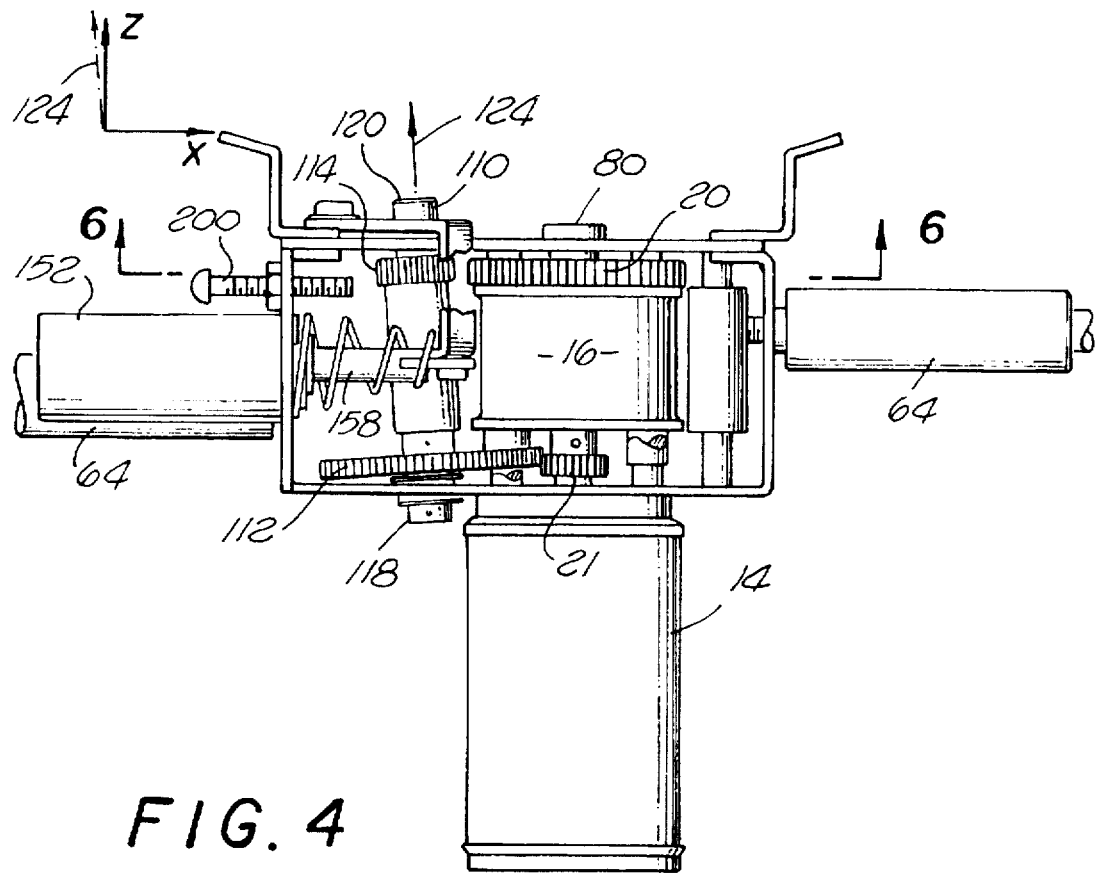
FIG. 4 is a side-elevated view of the assembly of FIG. 2, shown in the manual operation mode.
Figure 5:
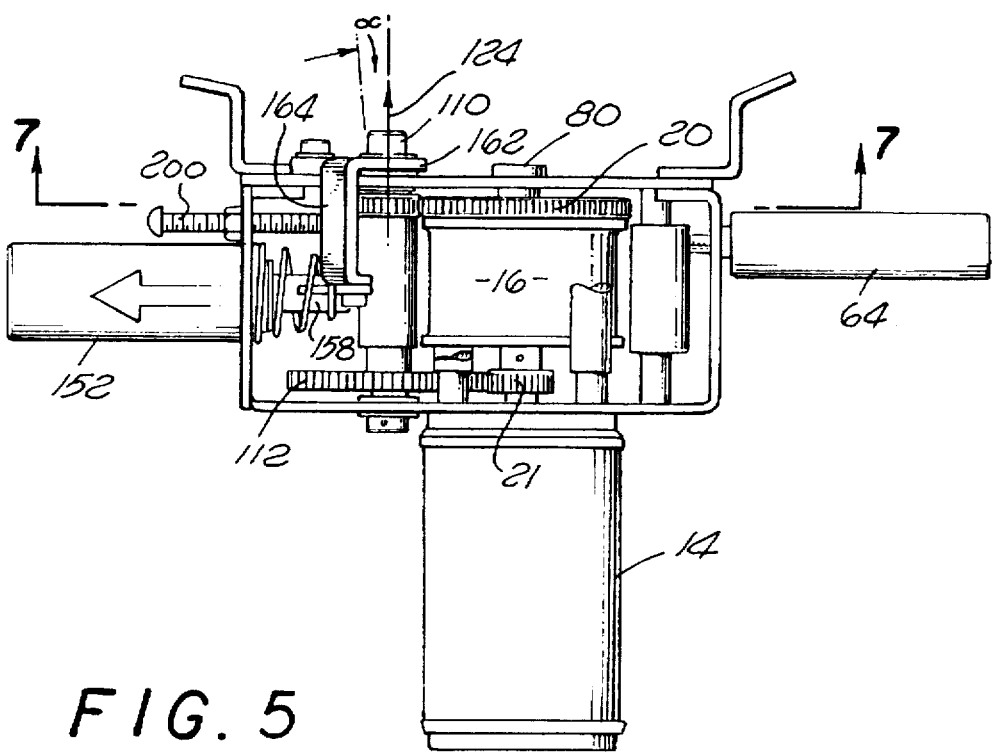
FIG. 5 is a side-elevated view of the assembly of FIG. 2, shown in the motor-drive operation mode.

The two positions of the driven shaft 110 are shown in FIGS. 4 and 5. In particular, where the end portion 120 is at the end 136 of the slot 132, the driven shaft 110 is offset from the Z-axis and thus also offset relative to the driven shaft 110 (FIG. 4). Where the end portion 120 is at the end 134 of the slot 132, the driven shaft 110 is aligned with the Z-axis and thus substantially parallel with the driven shaft 110 (FIG. 5). Significantly, because the smaller gear 114 is fixed to the end 120 of the driven shaft 110, the smaller gear 114 is brought into engagement with the pulley-gear 20 (FIG. 5) and taken out of engagement (FIG. 4) as the driven shaft 110 is moved. In this regard, the length of the slot 132, of course, must enable sufficient mobility in the end portion 120 of the driven shaft 110 for such full engagement and disengagement of the smaller gear 114. However, because the larger gear 112 has a relatively greater radius and is fixed to the end portion 118 of the driven shaft 110, the larger gear 112 remains in engagement with the driving gear 21 on the motor shaft 80, regardless of the position of the driven shaft 110.

In view of the foregoing, it can be seen that the t-m arrangement 22 as a whole is moved when the driven shaft 110 is moved. And, guided by the slot 132, the t-m arrangement 22 can be pivoted along the X-axis between the fully-engaged position (FIG. 5) and the partially-disengaged position (FIG. 4).

With respect to the fully-engaged position of the t-m arrangement 22, it entails the full engagement of both a first pair of gears (the larger gear 112 and the driving 21) and a second pair of gears (the smaller gear 114 and the pulley-gear 20). The engagement between the second pair of gears ultimately couples the pulley 16 to the motor 14 for enabling motorized operation of the assembly 10.

With respect to the partially-disengaged position of the t-m arrangement 22, it entails the disengagement of only the second pair of the gears (the smaller gear 114 from the pulley-gear 20), which effectively decouples the pulley 16 from the motor 14, allowing manual operation of the door 40.

It is noted that while the larger gear 112 remains in engagement with the driving gear 21, the significance of which is explained below, such engagement has no adverse effect on the ability of the pulley 16 to freely rotate about the motor shaft 80. It is only when the smaller gear 114 is engaged with the pulley-gear 20 that the pulley 16 becomes effectively "locked" to the rotation of the motor shaft 80 and thus to the motor 14. And when the pulley 16 is so "locked" to the motor 14, activation of the motor 14 enables the driving gear 21 to drive the larger gear 112 and thus the smaller gear 114 which further drives the pulley-gear 20 ultimately driving the pulley 16 for drawing the tensile member 18.

With the t-m arrangement 22 in the fully-engaged position, the disparity in the radii between each pair of gears multiplies the torque of the motor 14 while reducing the rotational speed of the pulley 16 at which it is driven by the motor 14.

In accordance with the present invention, only one of the two pairs of gears within the assembly 10 remains engaged when the assembly 10 reverts from motorize operation to manual operation. The one pair of gears remains engaged for purposes of facilitating this changeover. In general, if a pair of gears were to disengage, there is a possibility that upon their attempt to re-engage, teeth between the pair may simply meet head on without meshing with one another. And where there are two pairs of gears, the possibility of improper re-engagement is twice-fold.

The present invention recognizing that the two pairs of gears are interrelated, e.g., the larger gear 112 and the smaller gear 114 through the driven shaft 110, substantially resolves this potential problem by maintaining one pair in engagement. With one pair of gears remaining engaged, this pair would rotate upon activation of the motor 14 which if interrelated to the other pair would then cause rotation in at least the driving gear of the other pair. Such driven rotation in the other pair would substantially rectify the misalignment between the gears.

In the embodiment of the assembly 10 described so far, it is the first pair gears (the larger gear 112 and the driven gear 21) that remains engaged. Accordingly, upon energization of the motor 14, the rotation of the larger gear 112 would substantially correct any misalignment between the smaller gear 114 and the pulley-gear 20.

While the assembly 10 may be configured to rather enable the smaller gear 114 and the pulley-gear 20 to remain in engagement, this configuration would require moving the larger and possibly more cumbersome gear 112 in and out of engagement. However, regardless of whether it is the first pair or the second pair of gears that remains in engagement, the assembly 10 permits energization of the motor 14 only after the actuator mechanism 24 has moved the t-m arrangement 22 into the full-engaged position to prevent the re-engaging pair of gears from grinding as rotation therein commences.

In accordance with the present invention, the t-m arrangement 22 in the fully engaged position couples the pulley 16 and the motor 14 for operation in the motorized mode. During the motorized operation, the t-m arrangement 22 increases the effective torque of the motor 14 while decreasing the rotational speed of pulley 16.

Referring primarily to FIGS. 3, 4 and 5, it is the actuator mechanism 24 that places the t-m arrangement 22 between full engagement and partial disengagement. To do so, the actuator mechanism 24 includes a lever structure 150 whose movement is actuated by a solenoid 152 and defined by a cam 154. Although the solenoid 152 may vary depending on the application of the assembly, a suitable solenoid is a Deltrol Controls Model No. SO 156-A, operating on 12 VDC.

The solenoid 152 is activated through the control box 42 and in one embodiment is mounted to the side panel 32 of the case C. The side panel 32 is configured with an aperture 158 through which a shaft 158 of the solenoid 152 extends. As typically provided, the solenoid shaft 158 rests in an extended position and is only retracted by the solenoid 152 when the latter is activation. A spring 160 is provided on the shaft 158 to return the shaft 158 to the extended position upon deactivation of the solenoid 152.

As part of the actuator mechanism 24, the lever structure 150 moves the t-m arrangement 22 to either full engagement or partial disengagement. In one embodiment, the lever structure 150 includes a plate portion 162 and a leg 164 extending therefrom. Best shown in FIG. 3, the end portion 120 of the driven shaft 110 of the t-m arrangement 22 extending beyond the slot 132 in the base plate 26 is journaled for rotation in an aperture 165 in the plate portion 162. The leg 164 extending from the plate portion 162 is attached to an end 166 of the solenoid shaft 158 by a coupling member 168 which enables the lever structure 150 to pivot about two points defined by pins 180 and 182.

To guide the movement of the lever structure 150, the cam 154 is provided and configured as a second elongated slot 188 in the base plate 26, adjacent the slot 132 but extending along the Y-axis. A stud 190 journaled for rotation through an aperture 192 in the plate portion 162 rides in the cam slot 188 of the base plate 26.

Figure 6:
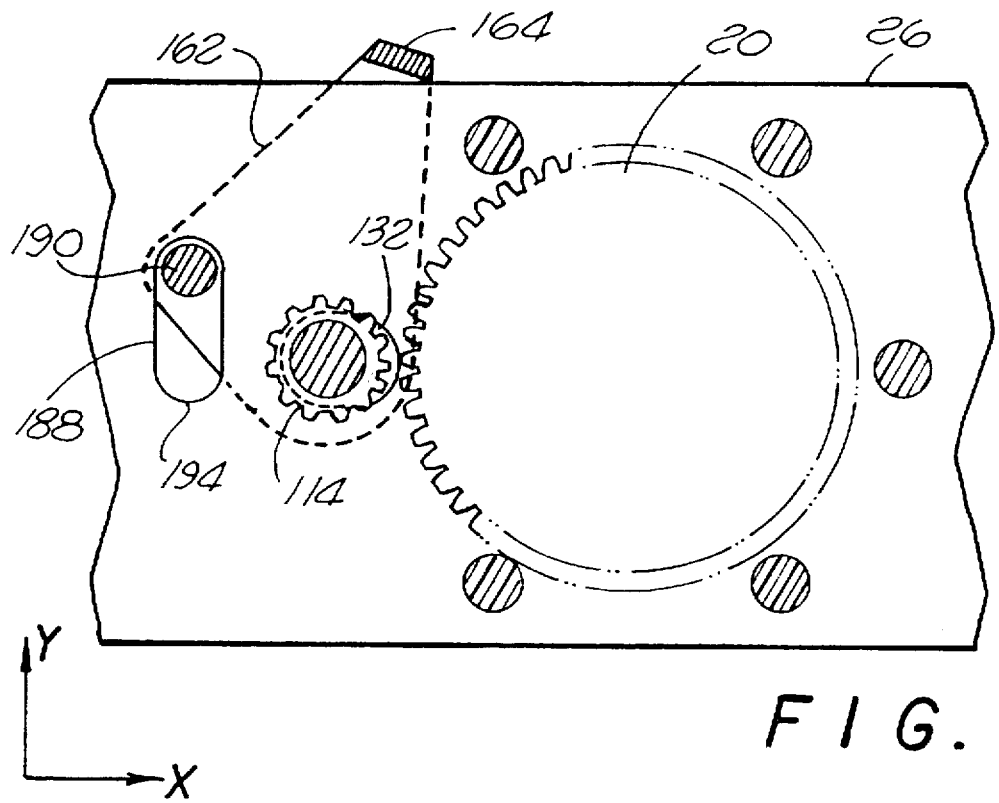
FIG. 6 is a cross-sectional view of FIG. 4 taken along lines 6—6.
Figure 7:
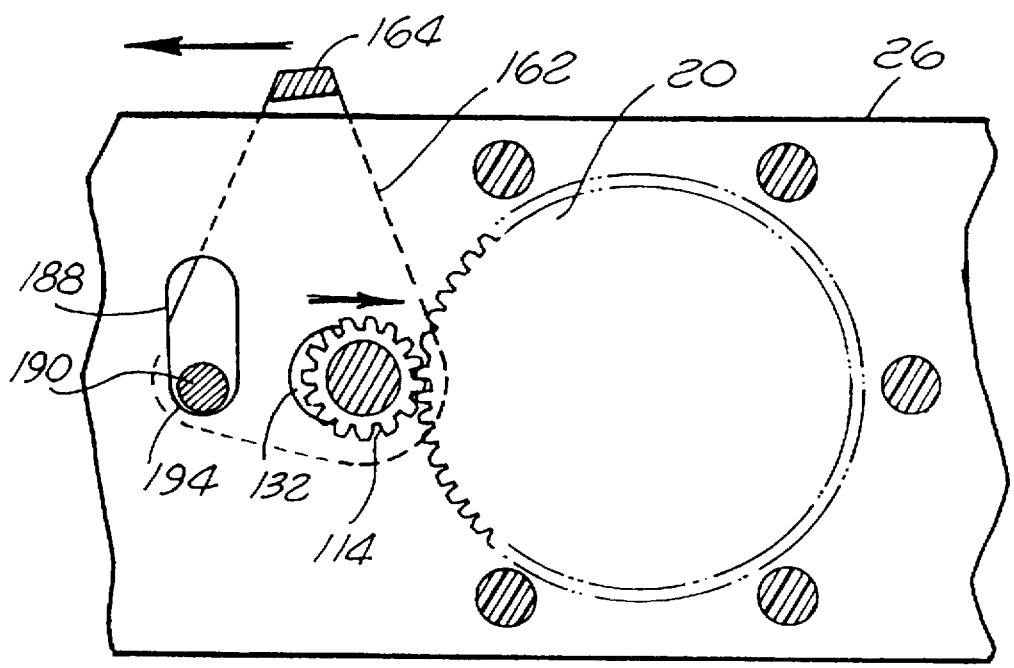
FIG. 7 is a cross-sectional view of FIG. 5 taken along lines 7—7.

In combination with the slot 132, the cam slot 188 enables the lever structure 150 to move in a manner for moving the t-m arrangement 22 between full engagement and partial disengagement (the plate portion 162 thereof being illustrated in FIGS. 6 and 7). Accordingly, as the solenoid shaft 158 is retracted into the solenoid 152, the lever structure 150 as guided by the cam 154 moves the driven shaft 110 of the t-m arrangement 22 from the partially disengaged position (FIG. 6) to the fully-engaged position (FIG. 7) to couple the pulley 16 to the motor 14 for motorized operation of the assembly.

It is noted that the assembly 10 may also be configured such that the solenoid shaft 158 is mounted on the side panel 34 and operates in the reverse, that is, when it is extended, the t-m arrangement 22 is in the fully-engaged position. It is further noted and emphasized that the cam slot 188 is positioned at right angles to the slot 132 and in a manner such that an end 194 thereof extends slightly beyond the longitudinal axis of the slot 132, as best shown in FIGS. 6 and 7. This slight overextension of the cam slot 188 leverages the lever structure 150 against the t-m arrangement 22 in the fully-engaged position to prevent the smaller gear 114 from disengaging. Often with the application of a significant load, the smaller gear 114 may work itself out of engagement with the pulley-gear 20.

To prevent the t-m arrangement 22 from overly engaging, a stopper 200, e.g., a positioning screw, is provided in the side panel 22, extending perpendicularly therefrom. Accordingly, the leg 164 of the lever structure 150 abuts against the stopper 200 when the solenoid shaft 158 is in the retracted position to prevent the teeth of the smaller gear 114 and the pulley-gear 20 from overreaching.

Referring primarily to FIGS. 1, 4 and 5, the following describes the operation of assembly 10 in accordance with the embodiments discussed above. Motorized operation of the assembly 10 is initiated by the operator activating the solenoid 152 via the control box 42. For avoiding damage to the various driving and driven components, the control box 42 is electrically configured to limit the energization of the motor 14 only after the solenoid 152 has been activated. Accordingly, upon activation of the solenoid 152, the solenoid shaft 158 is retracted, drawing the lever structure 150 toward the solenoid 152 as shown in FIG. 5.

With the lever structure drawn toward the solenoid 152, the plate portion 162 guided by the slot 188 and 132 pivots the offset driven shaft 110 about the end 118 to bring the t-m arrangement 22 into the fully-engaged position. With the t-m arrangement 22 in the fully-engaged position, the driven shaft 110 is parallel with the motor shaft 80, enabling the smaller gear 114 on the driven shaft 110 to engaged with the pulley-gear 20 on the motor shaft 80. This action effectively "locks" the pulley 16 to the motor 14.

Although the larger gear 112 has been in engagement with the driving gear 21 prior to the activation of the solenoid 152, the larger gear 112 was not laterally aligned with the driving gear 21. The engagement of the t-m arrangement 22 brings the larger gear 112 into lateral alignment with the driving gear 21 for optimum engagement therebetween.

The control box 42 then energizes the motor 14 to drive the motor shaft 80 in one of two directions for opening or closing the door 40. As the motor 14 drives the assembly 10, the t-m arrangement 22 simultaneously increases the effective torque of the motor 14 while reducing the rotational speed of the pulley 16 relative to the speed of the motor 14.

As mentioned, the t-m arrangement 22 is able to remain in the fully-engaged position during motorized operation against the forces created by the load of the door 40. Due to the configuration of the slot 188 relative to the slot 132, the smaller gear 114 is prevented from working itself out of engagement with the pulley-gear 20.

Accordingly, the operator may open or close the door 40 with the appropriate control of the motor 14 in the assembly which maintains activation of the solenoid 152. The assembly 10 may thus remain in the motorized mode for as long as desired, until the operator deactivates the solenoid 152 through the control box 42.

Upon deactivation of the solenoid 152 by the operator in preparation for manual operation of the door 40, the solenoid shaft 158 is released and brought into the extended position by the spring 160. The lever structure 150 is therefore directed away from the solenoid 152, as shown in FIG. 4, moving the plate portion 162 which pivots the driven shaft 110 about the end 118 to return the t-m arrangement 22 to the partially-disengaged position.

With the t-m arrangement 22 in the partially-disengaged position, the smaller gear 114 on the driven shaft 110 is completely disengaged from the pulley-gear 20 on the motor shaft 80, effectively "unlocking" the pulley 16 from the motor 14. The larger gear 112 however remains in contact with the driving gear 21 as explained, to facilitate subsequent reengagement of the t-m arrangement 22. With the pulley 16 "unlocked" from the motor 14, the pulley 16 may freely rotate to accommodate manual movement of the door 40.

If the operator wishes to revert back to motorized operation, he may simply activate the solenoid 152 whereupon the process described above is repeated.

It may be seen that the system of the present invention may be readily incorporated in various embodiments to provide a selectively engageable motor drive assembly. The various members and relative dimensions disclosed herein are merely exemplary, and of course, various alternative techniques may be employed departing from those disclosed and suggested herein. For example, the assembly may be configured wherein activation of the solenoid disengages the t-m arrangement. Also, the gears of the t-m arrangement may be varied to produce varying ratios of torque-multiplication and/or rotational speed reduction. The cam may be configured differently so long as the t-m arrangement 22 is prevented from working itself out of the engagement position. The lever structure may also be configured differently so long as it accomplishes moving the t-m arrangement in and out of engagement.

Consequently, it is to be understood that the scope hereof should be determined in accordance with the claims as set forth below.

What is claimed is:

1. A selectively engageable motor-drive assembly for use in operating a vehicle door or ramp, comprising:
   a motor;
   a pulley drawing a cable attached to the door or ramp;
   a torque-multiplying arrangement positionable between a first position wherein said pulley is decoupled from said torque-multiplying arrangement for manual operation and a second position wherein said torque-multiplying arrangement is coupled to said pulley for motorized operation;
   an actuator mechanism comprising a lever structure for moving said torque-multiplying arrangement between said first and second positions and a cam for guiding movement of said actuator mechanism; and
   a solenoid for actuating said lever structure between said first and second positions and for positioning the torque multiplying arrangement in accordance with a selection of said manual or motorized operation.

2. A motor-drive assembly in accordance with claim 1, wherein said torque-multiplying arrangement comprises a larger gear and a smaller gear configured for joint rotation about an axis wherein one of said gears is coupled to said motor and the other of said gears is coupled to said pulley during said motorized operation of said assembly.

3. A motor-drive assembly in accordance with claim 2, further comprising a motor shaft extending from and coupled to said motor and a driving gear affixed to said motor shaft and said driving gear being driven by said motor and said one gear being releasably coupled to said driving gear for enabling motorized operation.

4. A motor-drive assembly in accordance with claim 1, wherein said torque-multiplying arrangement is contained within a housing structure and said actuator mechanism is pivotally mounted within said housing structure and pivots between said first and second positions.

5. A motor-drive assembly in accordance with claim 1, further comprising a control unit for conditionally actuating said motor for said manual operation of said assembly.

6. A motor-drive assembly in accordance with claim 5, wherein said control box conditionally actuates said motor upon a condition of said solenoid.

7. A motor-drive assembly in accordance with claim 1 wherein said actuator mechanism comprises:
   a lever structure movable between one position and another position to engage and disengage said torque-multiplying arrangement; and
   a cam structure to guide movement of said lever structure in a predetermined manner for locking said lever structure in said one position.

8. A motor-drive assembly in accordance with claim 2, wherein said actuator mechanism pivots said torque-multiplying arrangement about an end of said axis to fully engage and partially disengage said torque-multiplying arrangement.

9. A motor-drive assembly in accordance with claim 2, wherein one of said gears of said torque-multiplying arrangement remains coupled with said motor or said pulley during either of said manual or motorized operation.

10. A selectively engageable motor-drive assembly for use in operating a vehicle door or ramp in a manual mode or a motorized mode, comprising:
    a bi-directional motor for said motorized mode;
    a pulley drawing a cable attached to the door or ramp;
    a plurality of torque-multiplying gears positionable between an engaged position wherein said pulley is releasably coupled to said motor for said motorized mode, and a disengaged position wherein said pulley is decoupled from said motor for said manual mode; and
    a lever actuator for positioning said torque-multiplying gears for said manual or motorized operation, said lever actuator comprising a cam for guiding movement of said lever actuator and for locking said lever actuator in place for said motorized operation.

11. A motor-drive assembly in accordance with claim 10 wherein said torque-multiplying gears comprises a larger gear and a smaller gear, said larger gear remaining intermeshed with a driving gear of said motor and said smaller gear configured to be releasably intermeshed with a pulley-gear secured for joint rotation with said pulley.

12. A motor-drive assembly in accordance with claim 11, wherein said larger gear and said smaller gear are secured for joint rotation about a driven shaft, said driven shaft being configured for pivotal movement about an end thereof by said lever actuator to engage and disengage said torque-multiplying gears from said driving gear and said pulley gear.

13. A motor-drive assembly in accordance with claim 10, wherein said pulley is journaled for independent rotation about a driving shaft driven by said motor, said pulley being secured for joint rotation with a pulley-gear, said pulley-gear also being journaled for independent rotation about said driving shaft.

14. A motor-drive assembly in accordance with claim 10, further comprising a solenoid for actuating said lever actuator.

15. A motor-drive assembly in accordance with claim 10, further comprising a housing structure, including a plate, and wherein said cam is configured as slots in said plate.

16. A motor-drive assembly in accordance with claim 15, wherein at least two of said slots are positioned angularly offset from each other.

17. A selectively engageable motor-drive assembly for use in operating a vehicle door or ramp in a manual mode or a motorized mode, comprising:
    a pulley with a pulley gear for drawing and releasing a cable attached to the door or the ramp;
    a bi-directional motor for operating said assembly wherein said pulley is releasably coupled to said motor;
    said motor having a motor shaft extending therefrom;
    a torque-multiplying arrangement which is releasably coupled to said motor and is positionable between an engaged position wherein said torque-multiplying arrangement is intermeshed with said pulley gear for motorized operation and a disengaged position wherein said torque-multiplying arrangement is disengaged from said pulley gear for manual operation; and,
    said pulley being mounted about said motor shaft and being freely rotatable about said motor shaft during manual operation and said pulley gear being coupled to said torque-multiplying arrangement during motorized operation.

18. The selectively engageable motor-drive assembly according to claim 17 wherein a smaller gear secured on said driving shaft is coupled to said torque-multiplying arrangement while said torque-multiplying arrangement is in said engaged or disengaged positions.

19. The selectively engageable motor-drive assembly according to claim 18 wherein said torque-multiplying arrangement comprises a driven shaft with a larger gear and a smaller gear secured on said driven shaft, said driven shaft mounted substantially parallel to said driving shaft while in the engaged position.

20. The selectively engageable motor-drive assembly of claim 19 wherein said torque-multiplying arrangement is pivotally mounted in a housing and an actuator mechanism pivots said torque-multiplying arrangement at one end between said engaged and disengaged positions.

21. A motor-drive assembly in accordance with claim 6, wherein said motor is actuated only after said solenoid moves said lever actuator to said second position.

* * * * *